(12) United States Patent
Padda et al.

(10) Patent No.: US 11,873,919 B1
(45) Date of Patent: Jan. 16, 2024

(54) ACTUATION BALL VALVE

(71) Applicant: Knight LLC, Irvine, CA (US)

(72) Inventors: Guntas Singh Padda, Irvine, CA (US); Enrique P. Loreto, Fullerton, CA (US)

(73) Assignee: Knight, LLC, Irvine, CA (US)

( * ) Notice: Subject to any disclaimer, the term of this patent is extended or adjusted under 35 U.S.C. 154(b) by 0 days.

(21) Appl. No.: 17/902,278

(22) Filed: Sep. 2, 2022

Related U.S. Application Data

(60) Provisional application No. 63/240,802, filed on Sep. 3, 2021.

(51) Int. Cl.
*F16K 31/60* (2006.01)
*F16K 5/06* (2006.01)

(52) U.S. Cl.
CPC ............... *F16K 31/60* (2013.01); *F16K 5/06* (2013.01)

(58) Field of Classification Search
CPC ........ F16K 31/60; F16K 31/50; F16K 31/502; F16K 5/06
See application file for complete search history.

(56) References Cited

U.S. PATENT DOCUMENTS

| | | | | | |
|---|---|---|---|---|---|
| 2,252,501 | A | * | 8/1941 | Foresman | F23J 3/06 406/137 |
| 4,625,758 | A | * | 12/1986 | Murray | F16K 31/502 137/554 |
| 5,269,343 | A | * | 12/1993 | Trapp | F16K 31/502 251/266 |
| 2016/0060713 | A1 | * | 3/2016 | Arnold | C12Q 1/6895 506/9 |

FOREIGN PATENT DOCUMENTS

WO   WO-2018202264 A1 * 11/2018

* cited by examiner

*Primary Examiner* — Patrick C Williams
(74) *Attorney, Agent, or Firm* — Stout, Uxa & Buyan, LLP; Donald E. Stout

(57) ABSTRACT

An actuation ball valve has an elongated knob which replaces prior art quarter turn valves. The knob comprises a thread that runs along a cylindrical portion of the knob, wherein the nut has a corresponding cut-out for the thread. This helps the knob move/slide in and out of the nut. The knob and nut are designed so that a specific distance can be covered in a quarter turn, as the valve moves from its horizontal (OFF) position to its vertical (ON) position. The knob and nut can be modified to travel various distances at different degrees of turn to actuate the system being controlled. The knob has a cut-out at the bottom which is used to insert one or more washers and a self-threading screw to stop the rotation of the knob with respect to the nut at it moves out in the OFF position.

10 Claims, 15 Drawing Sheets

ACTUATION BALL VALVE

This application claims the benefit under 35 U.S.C. 119(e) of the filing date of Provisional U.S. Application Ser. No. 63/240,802, entitled Actuation Ball Valve, and filed on Sep. 3, 2021, which application is herein expressly incorporated by reference, in its entirety.

BACKGROUND OF THE INVENTION

A ball valve is a flow control device which uses a hollow, perforated and pivoting ball to control liquid flowing through it. It is open when the ball's hole is in line with the flow inlet and closed when it is pivoted 90-degrees (hence the name "Quarter-turn valve") by the valve handle, blocking the flow. The handle lies flat in alignment with the flow when open, and is perpendicular to it when closed, making for easy visual confirmation of the valve's status. Ball valves are durable, performing well after many cycles, and reliable, closing securely even after long periods of disuse. These qualities make them an excellent choice for shutoff and control applications, where they are often preferred to gates and globe valves, but they lack the fine control of those alternatives, in throttling applications.

Prior art quarter turn valves tend to be big in size and weight, cost a lot because of the material from which they are fabricated, and are difficult to incorporate into many systems, such as the one disclosed in this application.

SUMMARY OF THE INVENTION

The present invention comprises an actuation ball valve having a knob which is designed and adapted to replace prior art quarter turn valves. As a result, the present inventive actuator is compact, easily tailored to need, light weight, and inexpensive.

The knob comprises a thread that runs along a cylindrical portion of the knob, wherein the nut has a corresponding cut-out for the thread. This helps the knob move/slide in and out of the nut. The knob and nut are designed so that a specific distance can be covered in a quarter turn (90 degrees), as the valve moves from its horizontal (OFF) position to its vertical (ON) position. The knob and nut can be modified to travel various distances at different degrees of turn to actuate the system being controlled. The knob has a cut-out at the bottom which is used to insert one or more washers and a self-threading screw to stop the rotation of the knob with respect to the nut at it moves/slides out in the OFF position. The washer surface, in this position, is flush with the nut surface and stops the knob in its horizontal position. In an illustrated embodiment, the system is actuated when the self-threading screw presses against a metallic tab. The nut has a cut-out as well, which helps to lock and hold it in place using a spring clip.

More particularly, in one aspect of the invention there is provided a chemical solution dispensing system, which comprises a water inlet, a chemical fluid inlet, a chemical solution outlet, and a proportioner, the proportioner being fluidly connected to each of the water inlet, the chemical fluid inlet, and the chemical solution outlet. A control valve is connected to the proportioner, the control valve being adapted to control a flow of water from the water inlet through the proportioner. A control actuator is connected to the control valve by an actuation shaft. The system further comprises an elongated control knob having a cylindrical portion, the control knob cylindrical portion being engaged with a knob nut, the elongated control knob functioning to close the control valve when the elongated control knob is in a horizontal orientation, and functioning to open the control valve when the elongated control knob is in a vertical orientation. The control knob cylindrical portion comprises a thread running along its length and the knob nut has a corresponding cut-out adapted to receive the thread, such that the control knob cylindrical portion is assisted in moving in and out of the knob nut when the elongated control knob is rotated between its horizontal and vertical orientations.

In a particular embodiment, the elongated control knob has a cut-out on a bottom thereof, which is adapted to receive one or more washers and a self-threading screw therein to stop rotation of the elongated control knob with respect to the knob nut. The knob nut also comprises a cut-out arranged to receive a spring clip to lock and hold the knob nut in place. The thread preferably comprises a helix.

A housing encloses the proportioner and portions of the water inlet, the chemical fluid inlet, and the chemical solution outlet, the elongated control knob extending from an external surface of the housing. In certain embodiments, the proportioner comprises a plurality of proportioners and the control valve comprises a plurality of control valves equal to the plurality of proportioners, such that there is a control valve associated with each proportioner.

In another aspect of the invention, there is provided a control valve for controlling a flow of fluid. The control valve comprises a control actuator connected to the control valve by an actuation shaft and an elongated control knob having a cylindrical portion, the control knob cylindrical portion being engaged with a knob nut, the elongated control knob functioning to close the control valve when the elongated control knob is in a horizontal orientation, and functioning to open the control valve when the elongated control knob is in a vertical orientation. The control knob cylindrical portion comprises a thread running along its length and the knob nut has a corresponding cut-out adapted to receive the thread, such that the control knob cylindrical portion is assisted in moving in and out of the knob nut when the elongated control knob is rotated between its horizontal and vertical orientations.

In disclosed embodiments, the elongated control knob has a cut-out on a bottom thereof, which is adapted to receive one or more washers and a self-threading screw therein to stop rotation of the elongated control knob with respect to the knob nut. The knob nut also comprises a cut-out arranged to receive a spring clip to lock and hold the knob nut in place. The thread comprises a helix.

The invention, together with additional features and advantages thereof, may be best understood by reference to the following description taken in conjunction with the accompanying illustrative drawings. In these accompanying drawings, like reference numerals designate like parts throughout the figures.

DESCRIPTION OF THE INVENTION

Figure 1:
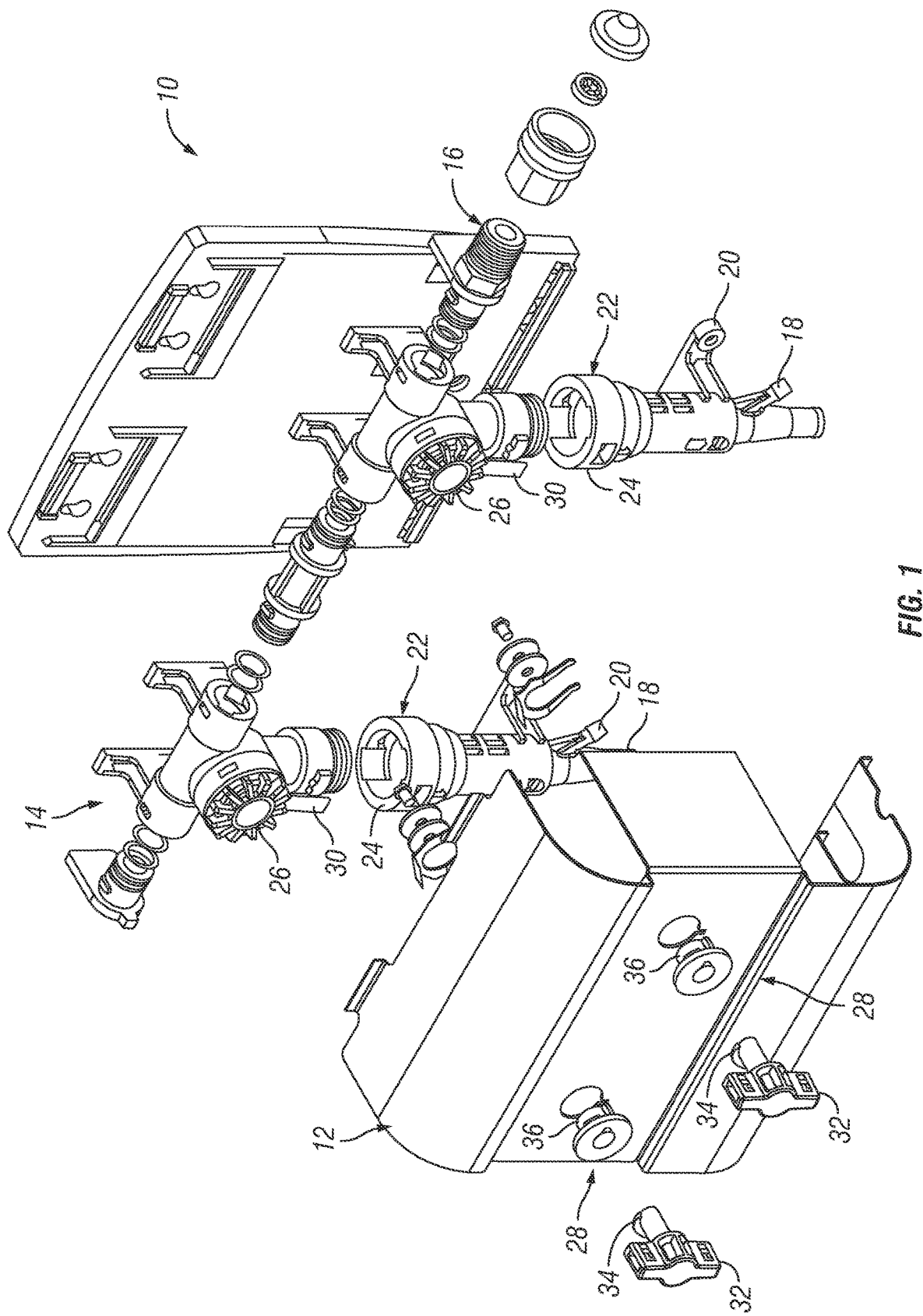
FIG. 1 is an exploded view, in perspective, of a double engine warewash chemical dispenser constructed in accordance with the principles of the present invention.
Figure 2:
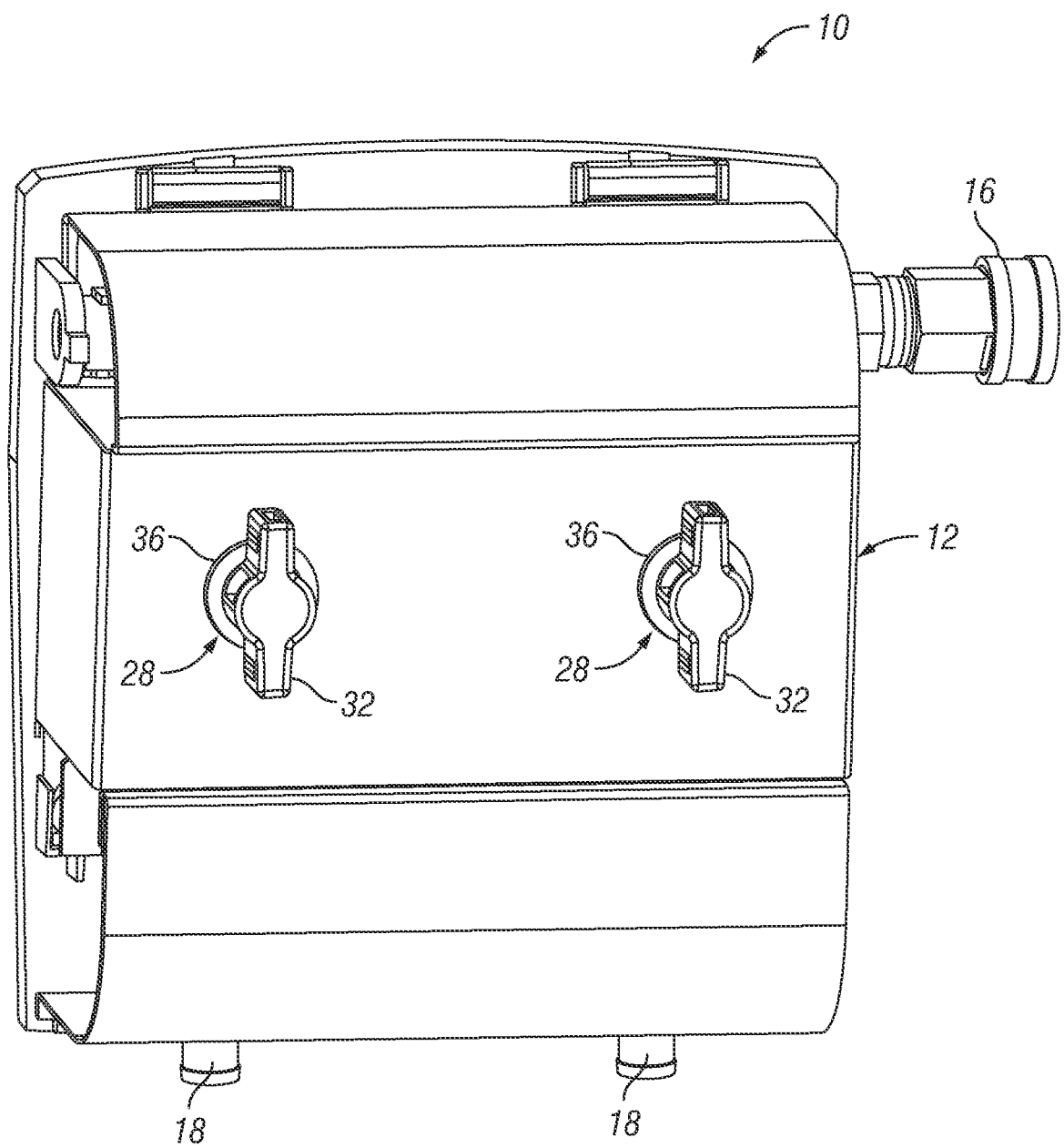
FIG. 2 is a frontal view of the double engine warewash chemical dispenser of FIG. 1.
Figure 3:
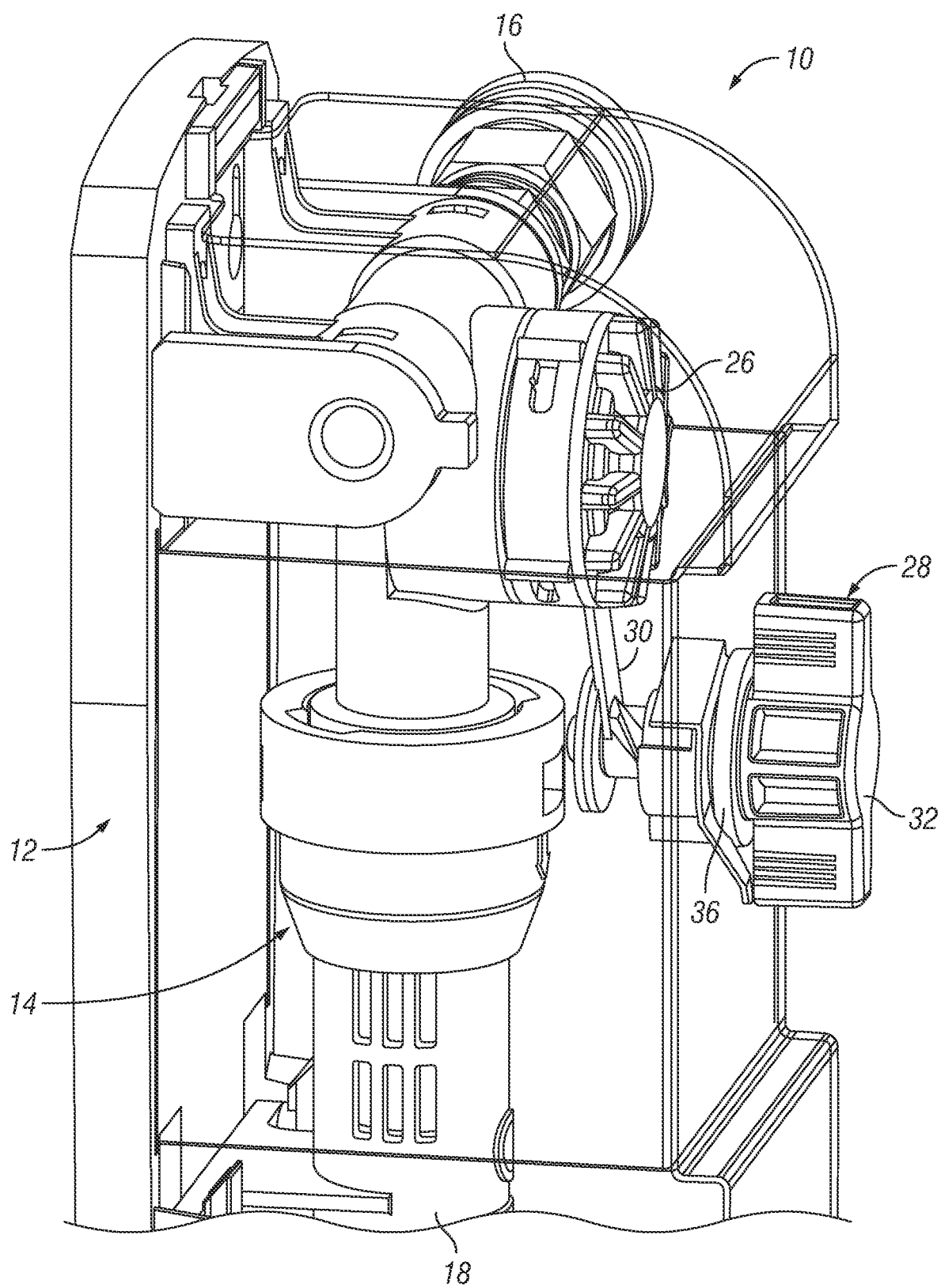
FIG. 3 is an isometric view of a warewash chemical dispenser which is similar to that of FIGS. 1 and 2, except that it is a single engine rather than double engine system, which figure particularly shows the actuation system usable in either the single engine or double engine warewash dispenser embodiments.
Figure 4:
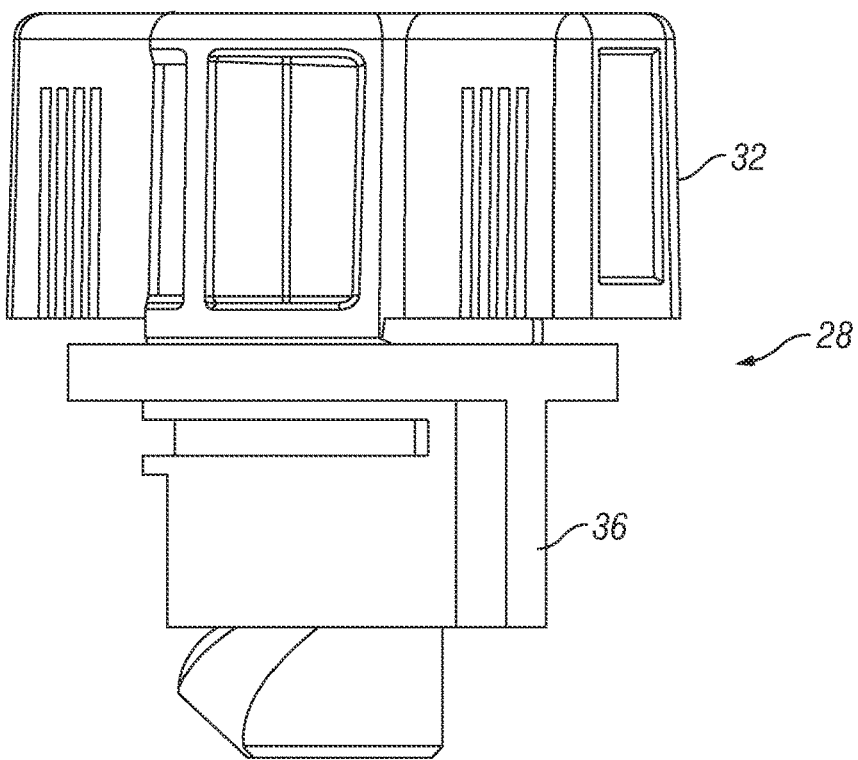
FIG. 4 is a plan view of an actuation ball valve constructed in accordance with the principles of the present invention, showing the valve in a closed/on position.
Figure 5:
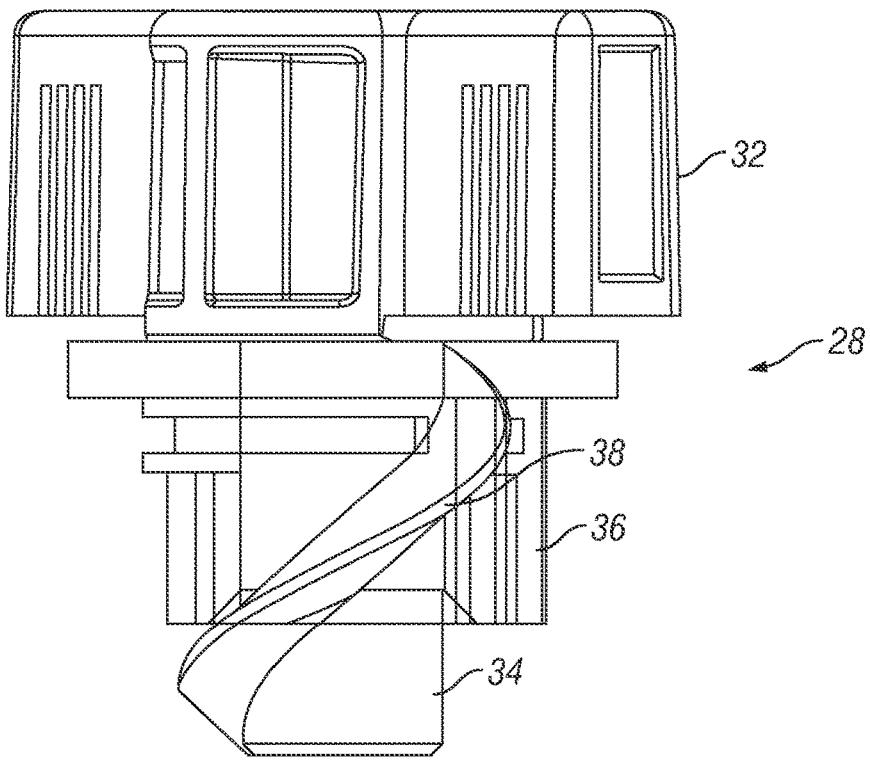
FIG. 5 is a plan view similar to FIG. 4, but which illustrates hidden portions of the assembled ball valve for clarity concerning features of the invention.
Figure 6:
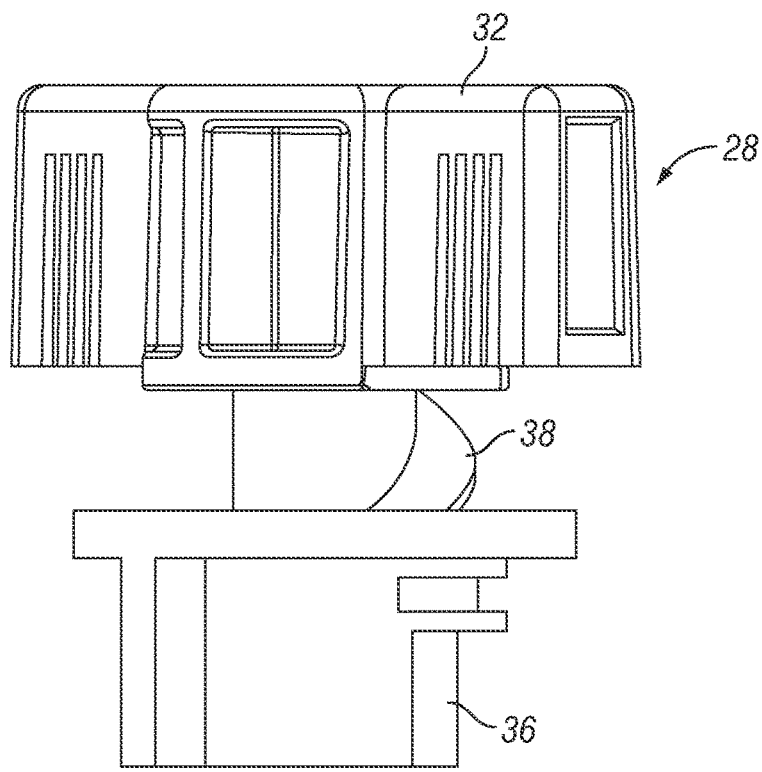
FIG. 6 is a plan view similar to FIG. 4, but showing the valve in an open/off position and from a different orientation.
Figure 7:
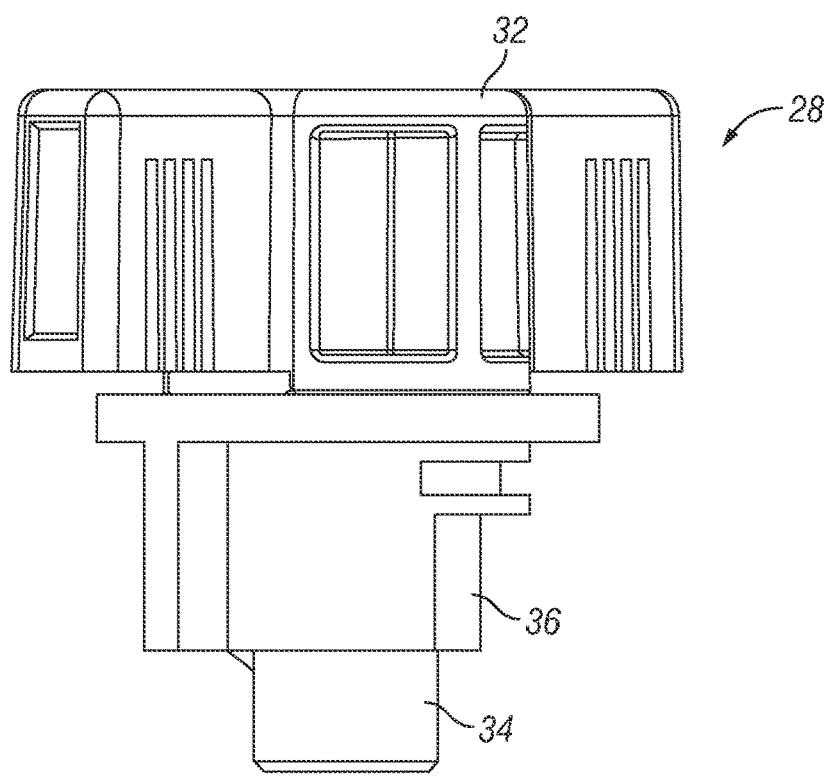
FIG. 7 is a plan view similar to FIG. 6, but showing the valve in a closed/on position.
Figure 8:
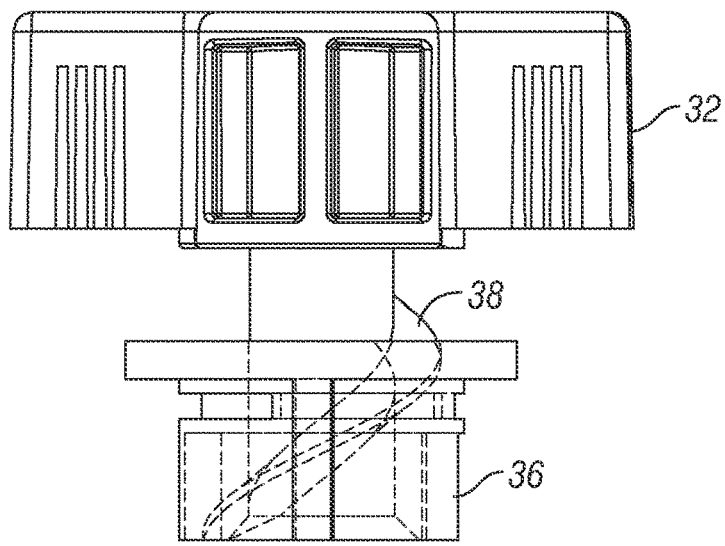
FIGS. 8-13 are various views showing an actuation ball valve constructed in accordance with the principles of the present invention, with the valve in an open/off position and wherein hidden lines are shown for clarity regarding features of the invention.
Figure 9:
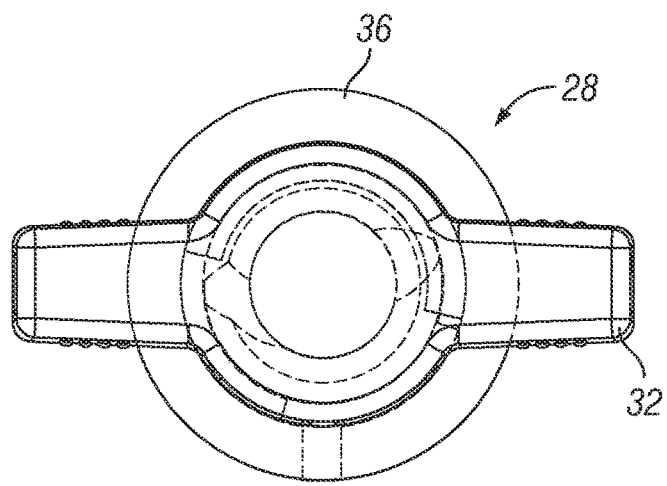
Figure 10:
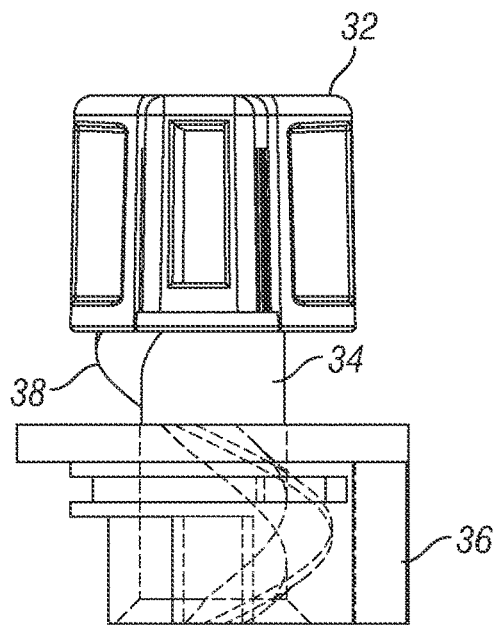
Figure 11:
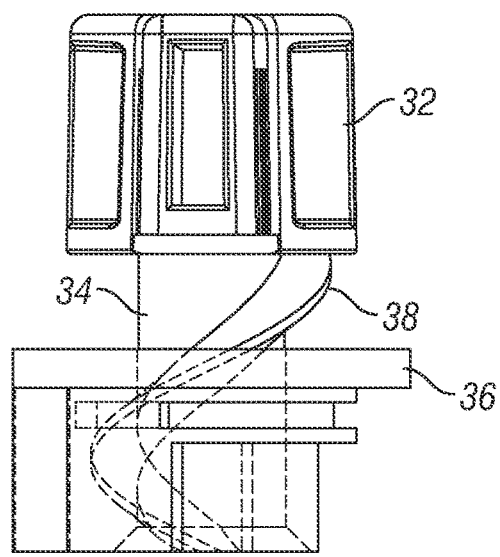
Figure 12:
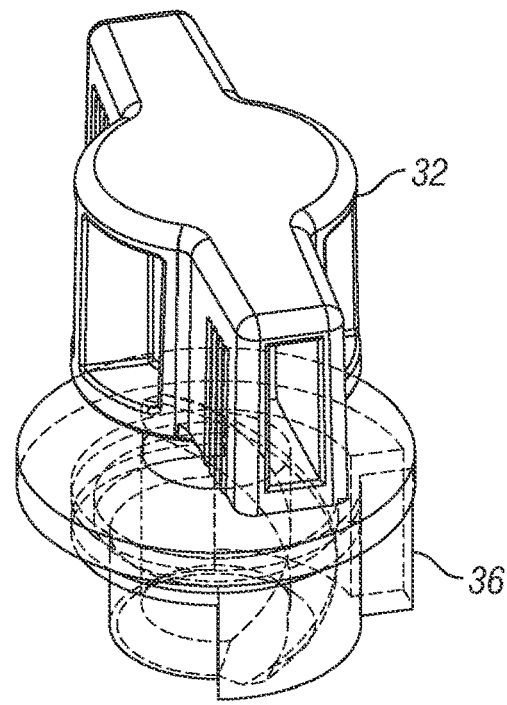
Figure 13:
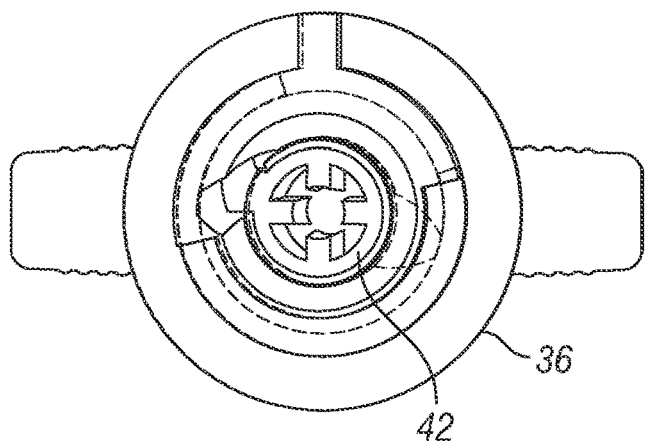
Figure 14:
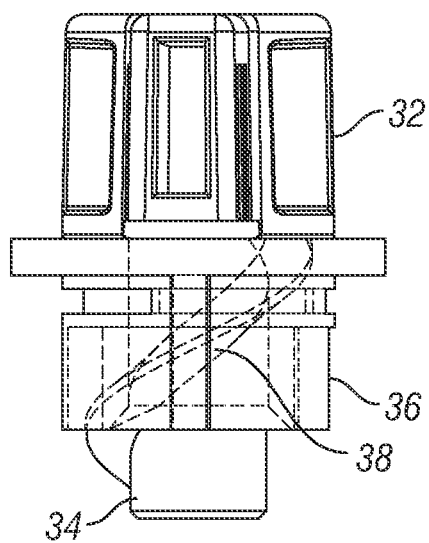
FIGS. 14-19 are various views, similar to FIGS. 8-13, showing the actuation ball valve in a closed/on position, and again wherein hidden lines are shown for clarity regarding features of the invention.
Figure 15:
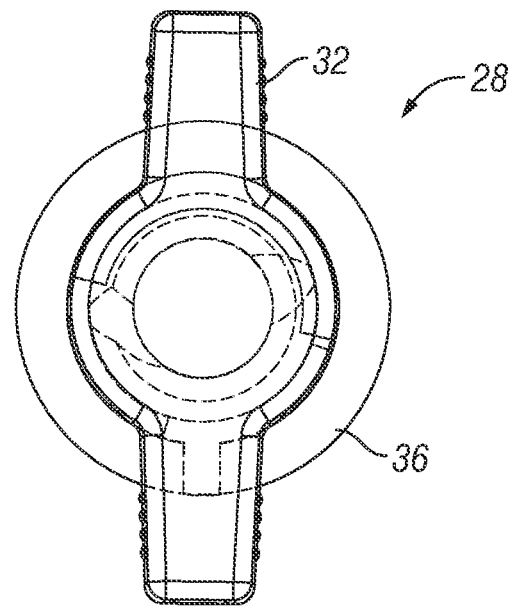
Figure 16:
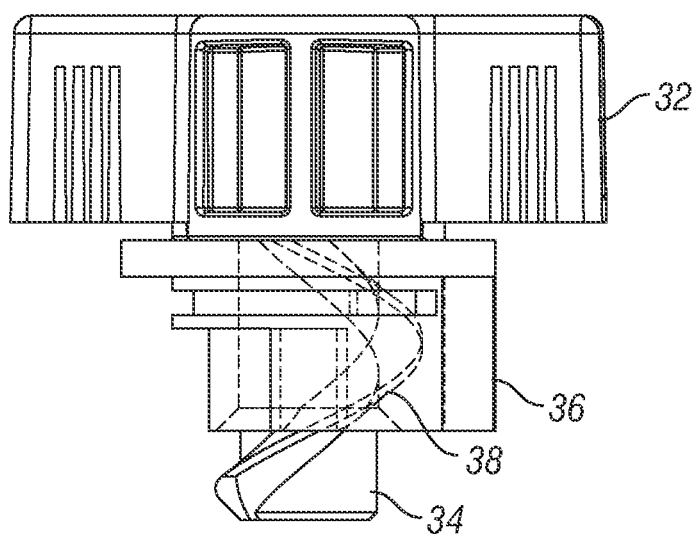
Figure 17:
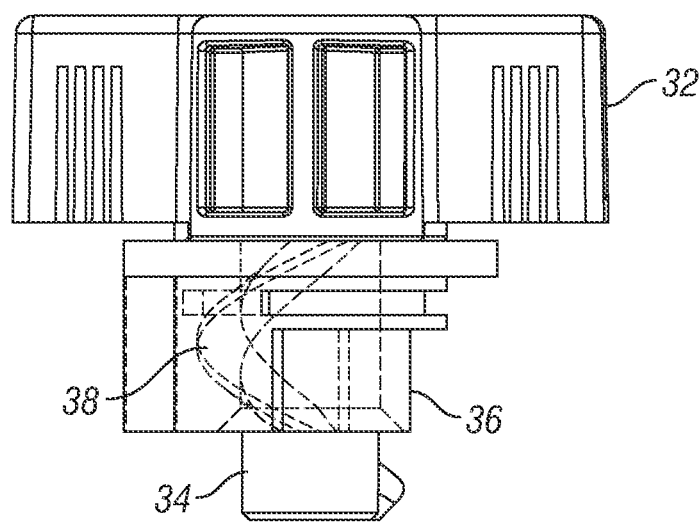
Figure 18:
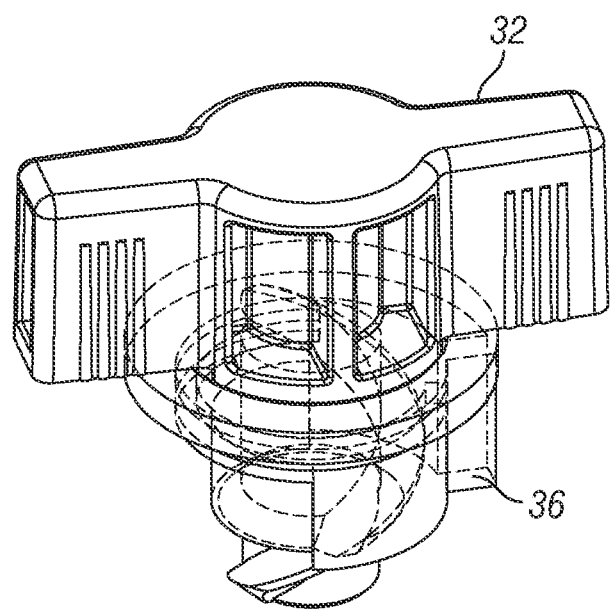
Figure 19:
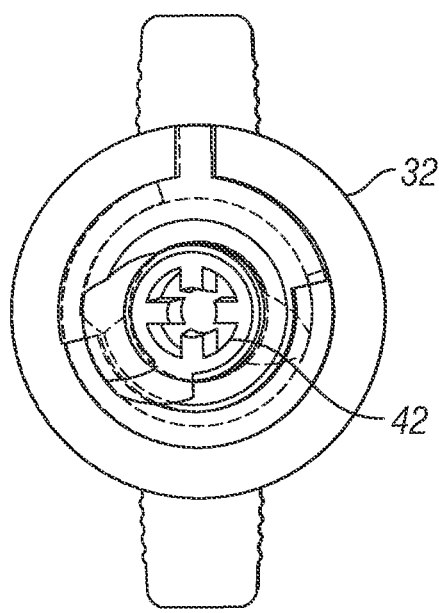
Figure 20:
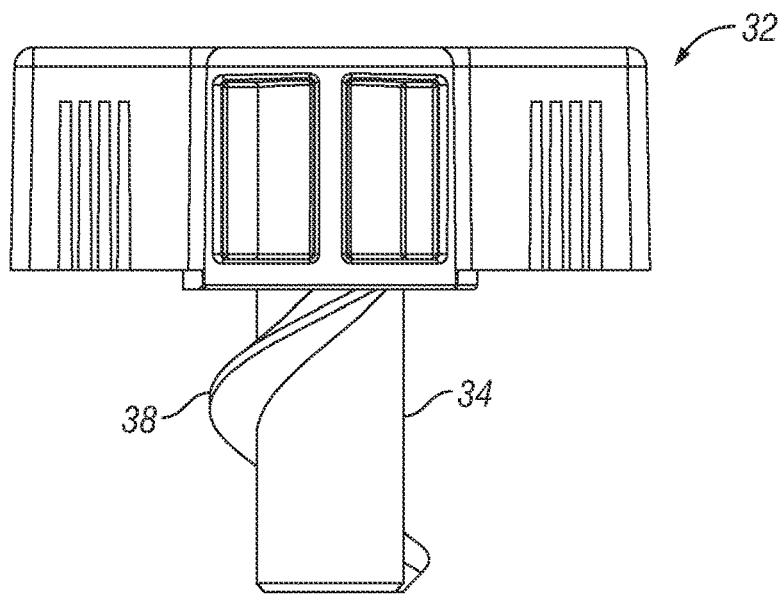
FIGS. 20-25 are various views showing the knob portion of the actuation ball valve of the present invention.
Figure 21:
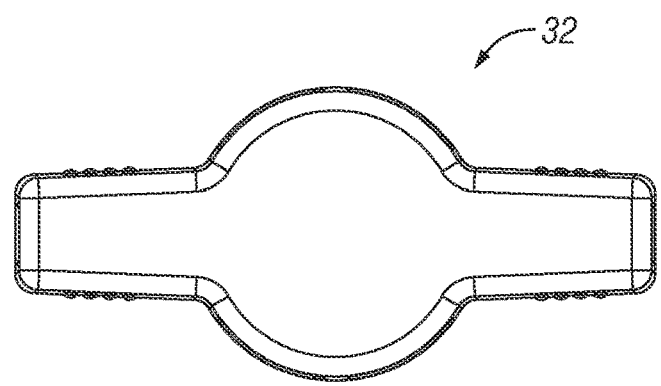
Figure 22:
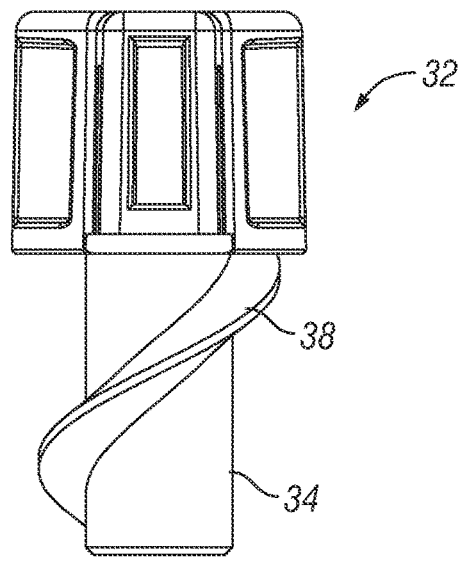
Figure 23:
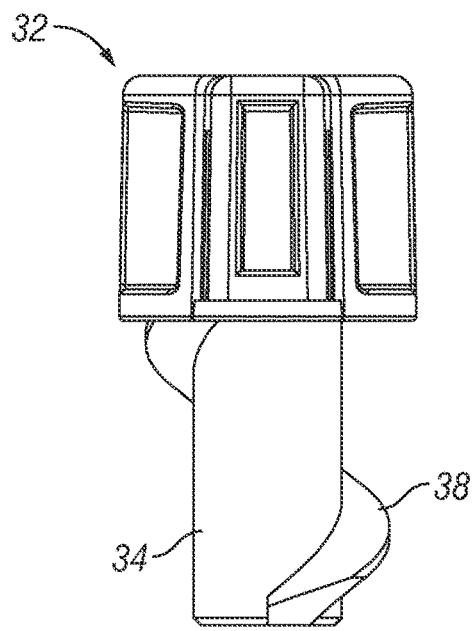
Figure 24:
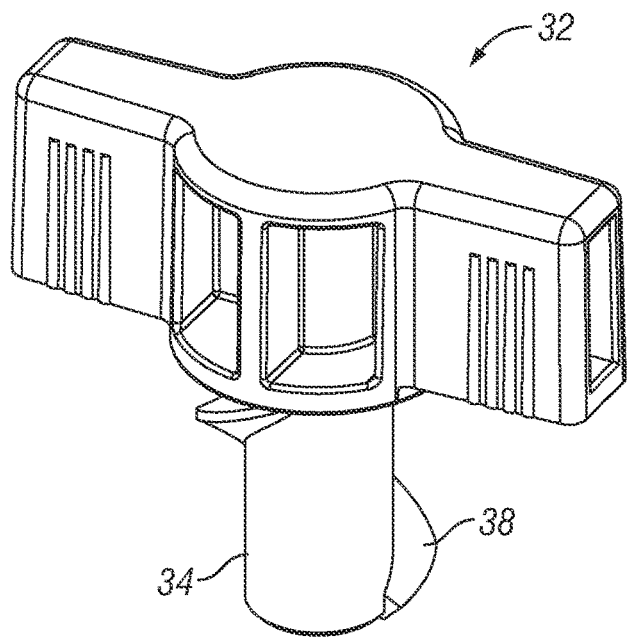
Figure 25:
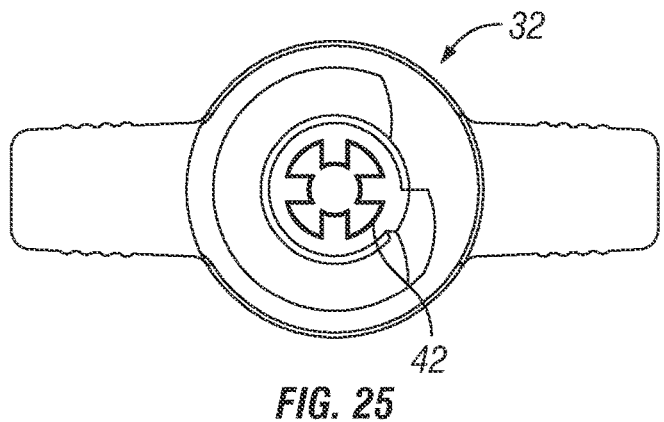
Figure 26:
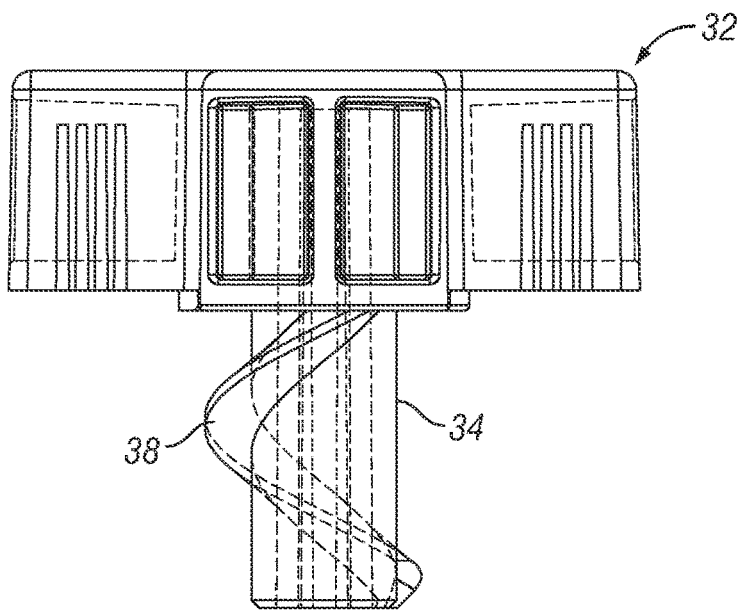
FIGS. 26-31 are various views of the knob portion, similar to FIGS. 20-25, wherein hidden lines are shown for clarity regarding features of the invention.
Figure 27:
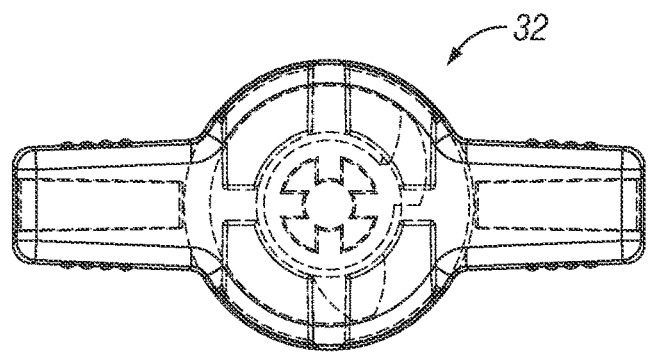
Figure 28:
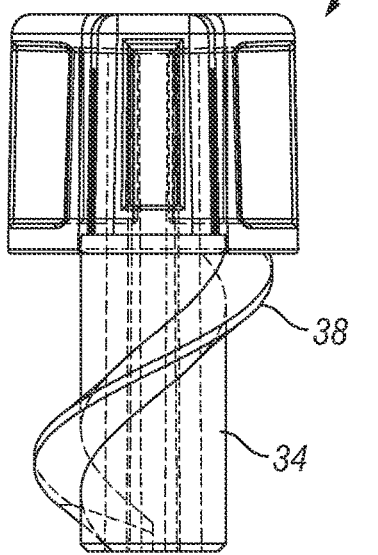
Figure 29:
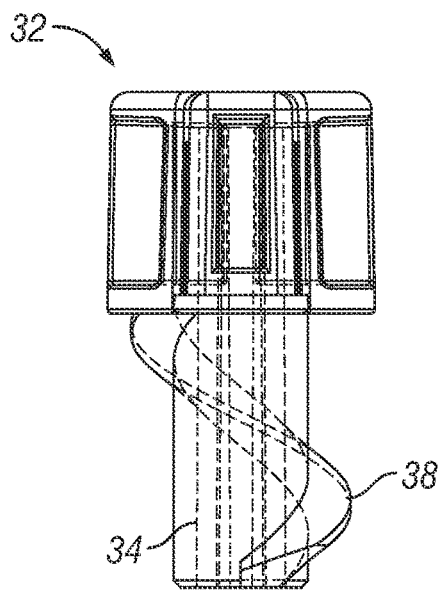
Figure 30:
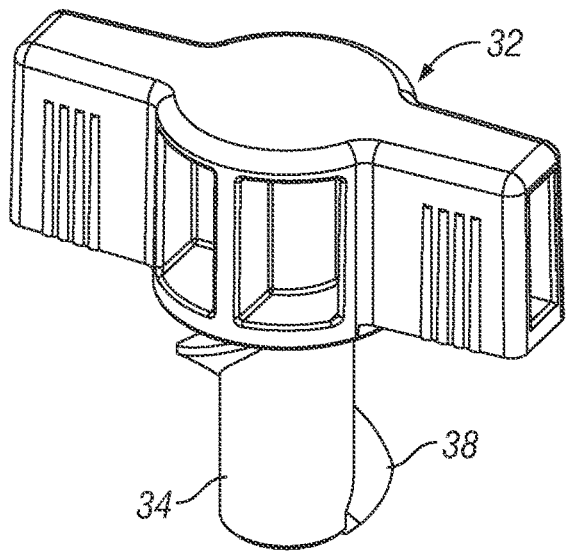
Figure 31:
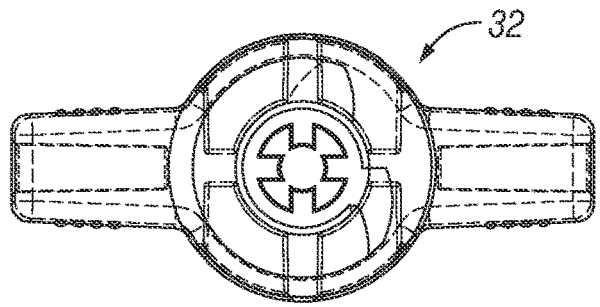
Figure 32:
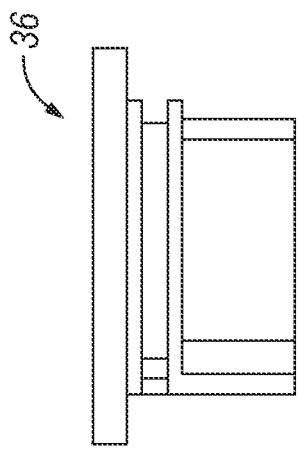
FIGS. 32-37 are various views, similar to FIGS. 20-25, showing the nut portion of the actuation ball valve of the present invention.
Figure 33:
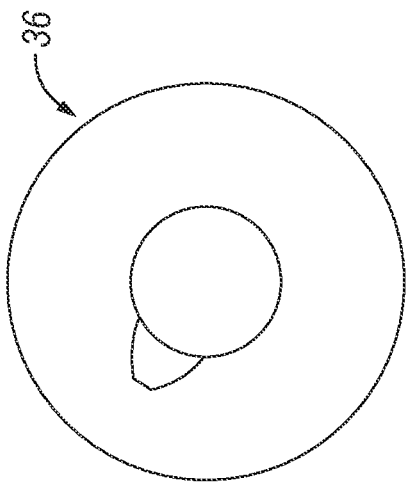
Figure 35:
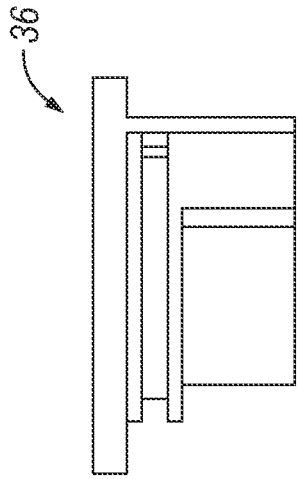
Figure 34:
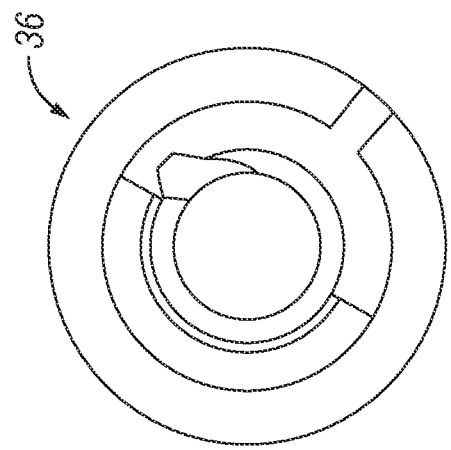
Figure 36:
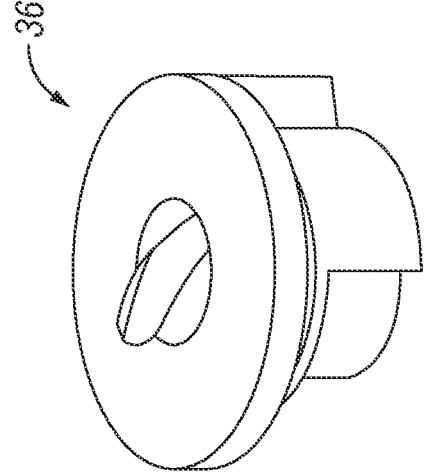
Figure 37:
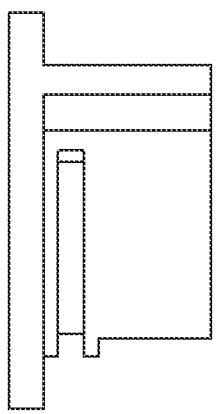
Figure 40:
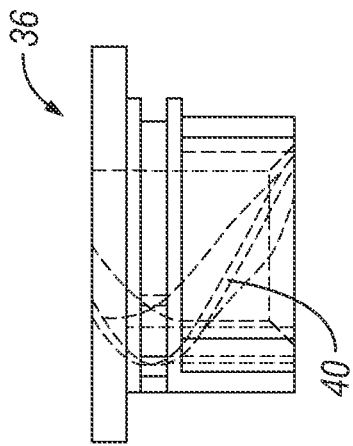
FIGS. 38-43 are various views of the nut portion, similar to FIGS. 32-37, wherein hidden lines are shown for clarity regarding features of the invention.
Figure 43:
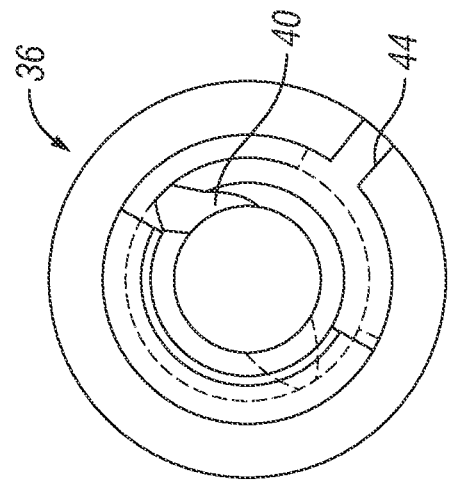
Figure 39:
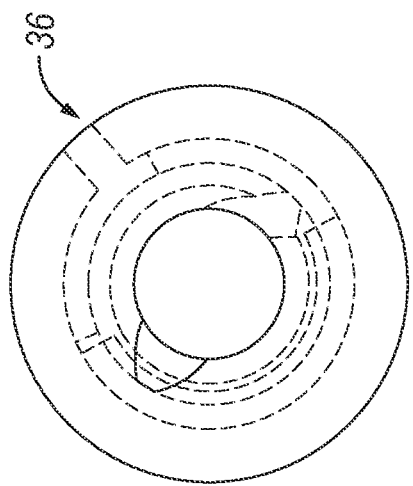
Figure 42:
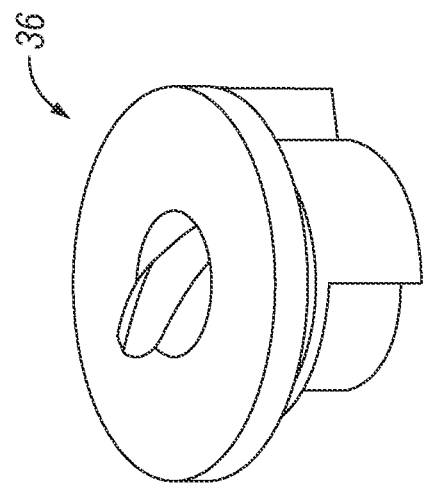
Figure 38:
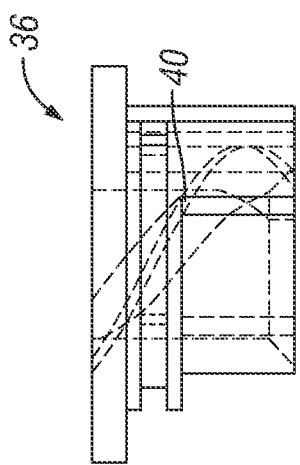
Figure 41:
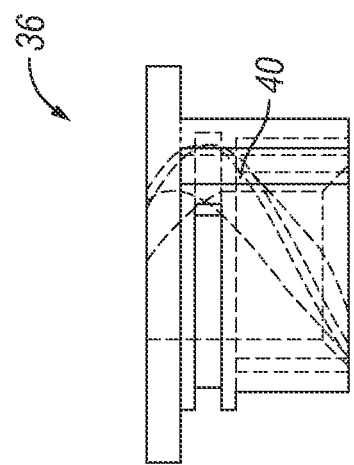

Referring now more particularly to the drawings, FIGS. 1-3 illustrate a system 10 comprising a housing 12 which encloses a chemical solution dispensing system 14 having a water inlet 16 and either one (FIG. 3 embodiment) or a plurality (FIGS. 1 and 2 embodiments) of chemical solution outlets 18.

Chemical fluid inlets 20 (FIG. 1) are provided for each proportioner 22, each proportioner 22 comprising a flex gap 24, as is known in the art. The chemical fluid inlets 20 are adapted for fitting to a metering tip connected to a chemical reservoir (the chemical reservoir, typically comprising a bottle filled with a suitable chemical fluid, such as detergent or sanitizer, and the metering tip are not shown).

Control valves 26 (FIG. 1) are provided for each proportioner 22, for controlling the flow of supplied water through the proportioner 22. The control valves 26 are actuated by control actuators 28, via an actuation shaft 30. The control valves each comprise a control knob 32 disposed on a shaft 34, which is engaged with a knob nut 36.

In operation, the system 10 is utilized by providing a supply reservoir/bottle (not shown) for each engine/proportioner 22 in the system 10, dropping a pickup tube into the open top end of the bottle and securing it to a metering tube of a desired size, which is then secured to the inlet 20 of the proportioner 22. A water supply, such as a hose (also not shown), is connected to the water inlet 16. The control knob 32 may then be rotated clockwise to open the valve 26 and counter-clockwise to close it, wherein in the illustrated embodiment the valve is open when the knob is vertically oriented and closed when horizontally oriented.

The remaining drawing FIGS. 4-43 illustrate the control actuator 28 of the present invention, in greater detail. FIGS. 4-19 illustrate the assembled control actuator 28, FIGS. 20-31 illustrate the control knob 32, and FIGS. 32-43 illustrate the knob nut 36.

As noted above, the present invention comprises the actuation ball valve 26/28 having the aforementioned knob 32 which is designed and adapted to replace prior art quarter turn valves. The prior art quarter turn valves tend to be big in size and weight, cost a lot because of the material from which they are fabricated, and are difficult to incorporate into a system such as the one disclosed. In contrast, the present inventive actuator is compact, easily tailored to need, light weight, and inexpensive.

The knob 32 comprises a thread 38 that runs along a cylindrical portion or shaft 34 of the knob, wherein the knob nut 36 has a corresponding cut-out 40 for the thread. This helps the knob 32 move/slide in and out of the nut. The knob 32 and nut 36 are designed so that a specific distance can be covered in a quarter turn (90 degrees), as the valve moves from its horizontal (OFF) position to its vertical (ON) position. The knob and nut can be modified to travel various distances at different degrees of turn to actuate the system being controlled. The knob 32 has a cut-out 42 at the bottom which may be used to insert one or more washers and a self-threading screw (not shown) to stop the rotation of the knob with respect to the nut as it moves/slides out in the OFF position. The washer surface, in this position, is flush with the nut surface and stops the knob in its horizontal position. In an illustrated embodiment, the system is actuated when the self-threading screw presses against a metallic tab. The nut has a cut-out 44 as well, which helps to lock and hold it in place using a spring clip.

As noted above, an important inventive feature is the thread 38 on the knob 32, which is accommodated by the thread cut-out 40 on the nut 36. Both the thread 38 and the thread cut-out 40 closely resemble a helix and are based and designed on a calculated pitch value and lead, adapted to the particular application. As defined, pitch is the distance between screw grooves and is commonly used with inch-sized products and specified as threads per inch. Lead is the linear travel per one screw revolution. Both of the thread profiles need to have a specific start point in order to achieve actuation of the mechanism within a one-quarter turn rotation. The unique design may be modified depending upon how much linear motion a screw needs to travel in a specific number of turns in order to achieve a desired function.

Although the inventive control actuator 28 is illustrated for use in a chemical solution dispensing system of the type 10 disclosed herein, it may be tailored to be used in many different environments wherein an on/off actuator is required.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A chemical solution dispensing system, comprising:
a water inlet;
a chemical fluid inlet;
a chemical solution outlet;
a proportioner, the proportioner being fluidly connected to each of the water inlet, the chemical fluid inlet, and the chemical solution outlet;

a control valve connected to the proportioner, the control valve being adapted to control a flow of water from the water inlet through the proportioner;

a control actuator connected to the control valve by an actuation shaft, the control actuator comprising:

an elongated control knob having a cylindrical portion, the control knob cylindrical portion being engaged with a knob nut, the elongated control knob functioning to fully close the control valve when the elongated control knob is in a horizontal orientation, and functioning to fully open the control valve when the elongated control knob is in a vertical orientation, wherein the control knob cylindrical portion comprises a thread running along its length and the knob nut comprises a corresponding cut-out adapted to receive the thread, such that the control knob cylindrical portion is assisted in moving in and out of the knob nut when the elongated control knob is rotated between its horizontal and vertical orientations.

2. The chemical solution dispensing system as recited in claim 1, wherein the elongated control knob has a second cut-out on a bottom thereof, which is adapted to receive one or more washers and a self-threading screw therein to stop rotation of the elongated control knob with respect to the knob nut.

3. The chemical solution dispensing system as recited in claim 2, wherein the knob nut also comprises a third cut-out arranged to receive a spring clip to lock and hold the knob nut in place.

4. The chemical solution dispensing system as recited in claim 1, wherein the thread comprises a helix.

5. The chemical solution dispensing system as recited in claim 1, and further comprising a housing enclosing the proportioner and portions of the water inlet, the chemical fluid inlet, and the chemical solution outlet, the elongated control knob extending from an external surface of the housing.

6. The chemical solution dispensing system as recited in claim 1, wherein the proportioner comprises a plurality of proportioners and the control valve comprises a plurality of control valves equal to the plurality of proportioners, such that there is a control valve associated with each proportioner.

7. A control valve for controlling a flow of fluid, the control valve comprising:

a control actuator connected to the control valve by an actuation shaft, the control actuator comprising:

an elongated control knob having a cylindrical portion, the control knob cylindrical portion being engaged with a knob nut, the elongated control knob functioning to fully close the control valve when the elongated control knob is in a horizontal orientation, and functioning to fully open the control valve when the elongated control knob is in a vertical orientation, wherein the control knob cylindrical portion comprises a thread running along its length and the knob nut comprises a corresponding cut-out adapted to receive the thread, such that the control knob cylindrical portion is assisted in moving in and out of the knob nut when the elongated control knob is rotated between its horizontal and vertical orientations.

8. The control valve as recited in claim 7, wherein the elongated control knob has a second cut-out on a bottom thereof, which is adapted to receive one or more washers and a self-threading screw therein to stop rotation of the elongated control knob with respect to the knob nut.

9. The control valve as recited in claim 8, wherein the knob nut also comprises a third cut-out arranged to receive a spring clip to lock and hold the knob nut in place.

10. The control valve as recited in claim 7, wherein the thread comprises a helix.

* * * * *